(12) United States Patent
Taylor et al.

(10) Patent No.: US 9,060,031 B1
(45) Date of Patent: Jun. 16, 2015

(54) ANONYMIZED PERSONALIZATION OF NETWORK CONTENT

(71) Applicant: Amazon Technologies, Inc., Reno, NV (US)

(72) Inventors: Brett R. Taylor, Bainbridge Island, WA (US); Peter F. Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 13/655,332

(22) Filed: Oct. 18, 2012

(51) Int. Cl.
- *G06F 15/173* (2006.01)
- *H04L 29/08* (2006.01)
- *H04L 29/12* (2006.01)

(52) U.S. Cl.
CPC ........ *H04L 67/2814* (2013.01); *H04L 61/1594* (2013.01)

(58) Field of Classification Search
CPC ....................................................... H04L 63/08
USPC ......... 709/224, 220, 222, 203, 235, 204, 217, 709/227
See application file for complete search history.

(56) References Cited

U.S. PATENT DOCUMENTS

| | | | |
|---|---|---|---|
| 5,961,593 | A | 10/1999 | Gabber et al. |
| 7,873,605 | B2 * | 1/2011 | Bhattacharyya et al. ..... 707/685 |
| 7,996,912 | B2 | 8/2011 | Spalink et al. |
| 2003/0208570 | A1 * | 11/2003 | Lapidous ...................... 709/222 |
| 2004/0203630 | A1 * | 10/2004 | Wang .......................... 455/414.1 |
| 2007/0279674 | A1 * | 12/2007 | Oomura ........................ 358/1.14 |
| 2008/0183686 | A1 * | 7/2008 | Bhattacharyya et al. ......... 707/4 |
| 2009/0248680 | A1 | 10/2009 | Kalavade |
| 2010/0124991 | A1 * | 5/2010 | O'Sullivan et al. ............. 463/42 |
| 2010/0161831 | A1 * | 6/2010 | Haas et al. .................... 709/235 |
| 2012/0079082 | A1 * | 3/2012 | Ding et al. .................... 709/220 |
| 2013/0132993 | A1 * | 5/2013 | Huchital et al. ................. 725/22 |
| 2013/0227057 | A1 * | 8/2013 | Goldstein et al. ............. 709/217 |
| 2014/0108531 | A1 * | 4/2014 | Klau ............................. 709/204 |

OTHER PUBLICATIONS

Gabber et al., "How to Make Personalized Web Browsing Simple, Secure, and Anonymous," Financial Cryptography, 16 pages (1997).

\* cited by examiner

*Primary Examiner* — Jude Jean Gilles
(74) *Attorney, Agent, or Firm* — Knobbe, Martens, Olson & Bear, LLP

(57) ABSTRACT

Features are disclosed for modifying identifying data including, but not limited to, demographic information, user identifiers, and device identifiers, according to user-definable preferences prior to transmitting content requests to content servers. The information may be modified to protect a user's privacy. In addition, the modified information may allow the content provider to serve a customized or targeted version of content that is more relevant to the user than a version that may otherwise be generated without the aid of identifying data. Users may elect to share some, all, or none of their identifying data with content providers, or users may elect to generalize their specific identifying data. Additional features include providing generalized or customized identifying data to cooperating content providers. Custom headers and other data fields may be provided to content providers, and content providers may choose to use information in the custom data fields or ignore it.

33 Claims, 7 Drawing Sheets

ANONYMIZED PERSONALIZATION OF NETWORK CONTENT

BACKGROUND

Client computing devices may be used to request content pages and other network-accessible content from content servers. In some cases, information identifying or otherwise associated with a user of the client device may be transmitted with a content request to the server. For example, a small file known as a cookie may have been previously sent to the client device in response to a content request. The cookie may include demographic, tracking, or identifying information. When the client device makes a subsequent content request to the server, the cookie may be transmitted with the content request, and the server can use the data in the cookie to determine the identity of the user, demographic information about the user, which content requests the user has previously made, etc. Content providers may use such data to provide more relevant content to users.

In many cases, a content request takes the form of a Hypertext Transfer Protocol (HTTP) request including a network address of the requested content, such as a Uniform Resource Locator (URL). Identifying information may be appended to the end of the URL as a query string. In addition, data such as the Internet Protocol (IP) address of the client device may be made available to the server when a connection is established, and data about various components of the client device may be embedded into the request itself. Such data may provide content providers with information that can be used to identify users and to track content requests made by users.

Proxy servers and other intermediary systems may be used to block cookies, obfuscate IP addresses, and the like. In a typical implementation, a content request from a client device is first routed through the proxy server, which processes the request and forwards it on to the content server. In some cases, the proxy server can create accounts with content servers and utilize those accounts when requesting content on behalf of client devices, thereby shielding the actual identity or demographics of users while still allowing content providers to tailor content to the users based on the accounts created by the proxy.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
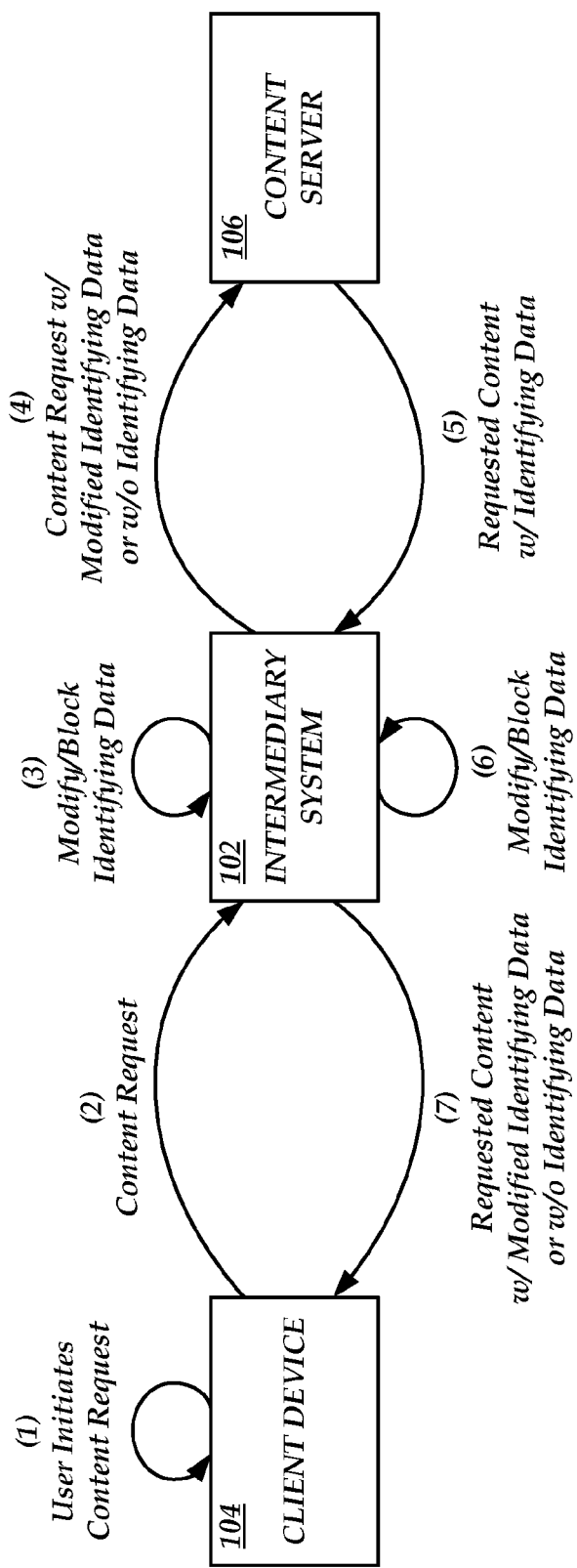
FIG. 1 is a block diagram of illustrative communications and data flows between a client device, an intermediary system and a content server.

The present disclosure is directed to modifying content requests to limit an extent to which information that may be used to track or identify users is exposed to content providers. Identifying or tracking information can include, but is not limited to, user identifiers, device identifiers, demographic information, and the like. Specifically, aspects of the disclosure will be described with respect to the modification of identifying or tracking information according to user-defined preferences prior to transmitting content requests to content providers. The information may be modified to protect a user's privacy, in some cases by providing anonymous or substantially anonymous requests. In addition, the modified information may allow the content provider to serve a customized or targeted version of content that is more relevant to the user than a version that may otherwise be generated without the aid of any identifying or tracking information.

In some embodiments, users may elect to share some, all, or none of their demographic and other identifying information with content providers, or users may elect to generalize their specific identifying information. For example, if a content request is accompanied by a cookie that includes identifying information, the identifying information may be modified, or the cookie may be stripped from the content request prior to transmission to the content provider. The modification may include removing a portion of the identifying information, substituting alternative identifying information, or generalizing identifying information. As a result, the request may be substantially anonymous while still providing some information that a content provider can use to respond with personalized, targeted, or otherwise more relevant content than would otherwise be provided in the absence of all identifying information. The modification can be made at a client device (e.g., by a browser), or by an intermediary system that requests content from the content provider on behalf of the user.

Additional aspects of the disclosure relate to providing customized or generalized demographic information to cooperating content providers. Custom headers and other data fields may be provided to content providers, and content providers may choose to use the information in the custom data fields or ignore it. For example, users may choose to expose generalized demographic information, such as gender and an age range, in lieu of information that may be used by content providers for tracking purposes or derived from previous content requests. The generalized information may be inserted into content requests such that those content providers that choose to utilize it may access it. In addition, the generalized information may be inserted into the content requests such that its presence does not affect the normal content request/response cycle of content providers that choose not to use the generalized information or do not know of its existence.

Further aspects of the disclosure relate to storing cookies at an intermediary system rather than passing them from a content provider to a client device. For example, when an intermediary system requests a content item from a content provider on behalf of a client device, the content server may send, in addition to the content item, cookies or other tracking information that the content provider wishes to place on the client device. In such cases, the intermediary system can strip out the cookies or other tracking information prior to sending the content item to the client device. In addition, the intermediary system can store the cookies so that they may be passed back to the content provider with subsequent requests. As a result, the content provider can continue to receive tracking information regarding the particular requesting client device without the cookies being stored on the client device. A user may then request content from the content provider using a different client device, and the intermediary system may pass the cookies associated with that user to the content provider, even though they may have been intended by the content provider to be stored on a different client device. The intermediary system may modify or anonymize the cookies as described with respect to other aspects of the disclosure, or the intermediary system may store them unmodified.

Although the illustrated embodiments make use of an intermediary system or a special browser to perform the request modification tasks, in other embodiments, these tasks may be performed by other components; for example, the content requests could be modified a client component that is separate from the browser but which monitors and selectively modifies content requests made by the browser. Further, the request modification tasks described herein can be applied to content requests made by non-browser applications. Although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

With reference to an illustrative embodiment, tracking information, such as demographic information or other data identifying a user or client device, is modified prior to transmission to a content provider. In a typical network content delivery environment, a content provider may use cookies to automatically identify individual users without requiring the users to log in or otherwise affirmatively identify themselves. The content providers can then customize the content or portions thereof based on the identities, demographic information, and/or past browsing behaviors of the requesting users. While using cookies for identification may allow for a more personalized experience, it also exposes the users to a risk of having their content requests and browsing habits tracked in a manner that compromises user privacy. By modifying the information in the cookies, the disclosed system enables users to maintain a level of privacy while still benefiting from personalized or more relevant content. In addition, content providers may still have the opportunity to provide more relevant content or advertisements without resorting to tracking measures and risking having all such tracking measures blocked without any alternative method of receiving identifying information.

A user may use a browser application on a computing device to submit a request for content offered by a content provider. The request may be submitted to an intermediary system that modifies identifying information that may be included in the request. The modifications can be made based on user preferences. For example, a user may wish to share all identification information with a first content provider, a subset of identification information with a second content provider, and only generalized identification information with a third content provider. In some cases, the user may wish to share no information. If the intermediary system determines that the current content request is a request for content offered by the third content provider, the intermediary system can modify the request such that only generalized identification information is submitted with the request. In one example, the user may be a 35-year-old male living in California and using a tablet computer that runs a specific operating system and browser version. During a prior browsing session or over the course of several browsing sessions, the third content provider may have captured or inferred these demographic characteristics, and placed on the user's computing device a cookie with information that the content provider can use to track the user an match the user against a profile of the user. The profile may include data regarding the demographic characteristics of the user that the third content provider inferred from previous browsing sessions, or it may include other data that the third content provider can use to serve content that is targeted or more relevant to the user. While the cookie and other identifying information would normally be sent to the third content provider with the subsequent content request, the intermediary system may intercept the cookie and generalize the information contained therein such that the content provider receives only the gender and an age range (e.g.: 20-39). For example, if specific demographic information was contained in the cookie, geographic location, device information, etc. may be stripped from the cookie or otherwise removed from the request according to the user's preferences. If tracking information was contained in the cookie, such as an identifier of the user or the client device, the tracking information may be modified or removed, and generalized information such as gender and age range may be substituted.

The generalized information may be selected by the user, or it may be automatically assigned by the intermediary system based on prior content interactions. For example, the intermediary system may have also captured or inferred the demographic characteristics based on prior content requests. The intermediary system can automatically generalize the information for future content requests. The user may also specify the generalized identifying data that is to be sent, either to specific content providers, to groups of content providers, or to all content providers.

In order to modify the information within the cookies that are sent to the content providers, the intermediary system may analyze the cookies that the content provider generates for a number of different users. The analysis may be used to determine the structure of the cookie and how to modify it so as to generalize certain information and to remove other unwanted information. In some cases, the structure of the cookie may be provided by technicians or administrators of the intermediary system. Some content providers encrypt or obfuscate the data that they include in the cookies. In such cases, a relationship with the content provider can be formed, where the content provider discloses the structure of the cookie or the decryption/encryption methods that the intermediary system may use to modify the data within the cookie. The intermediary system can, in return, assure the content provider that at least some demographic information will be provided instead of blocking the cookie altogether. If no relationship with the content provider can be formed, then the intermediary system may block the cookie in order to preserve the privacy of the user.

The intermediary system may also implement customized data fields that can be included in requests transmitted to content providers as an alternative to modifying the information that the content providers themselves track and transmit. For example, headers may be added to Hypertext Transfer Protocol (HTTP) requests, parameters may be appended to a query string at the end of a URL, RESTful application programming interfaces (APIs) may be used, etc. In the case of customized HTTP headers, the headers may contain generalized demographic data or data that users otherwise allow to be shared with content providers. The content providers may inspect and use the data within the headers in order to provide a more personalized experience to the user without requiring any cookies or other tracking and identification methods. When providing the customized data fields, the intermediary system may block other methods of receiving identifying information, such as cookies, query strings, RESTful APIs, and the like.

In addition to modifying or blocking demographic and other identifying information that is typically sent to content providers, the intermediary system may also modify or block identifying information and other forms of tracking information that content providers send to client devices. For example, if a content provider transmits a cookie in a response to a content request, the intermediary system may strip the cookie from the response. In some embodiments, cookies may be modified as they are received from content providers and then stored on the client device. Such cookies may not need to be modified when content requests are subsequently made from the client device to the content provider.

In some cases, the intermediary system may store the cookie so that it may be modified or used with future requests even though it is not sent to and stored on a client device. As a result, the cookies—whether modified or unmodified—may be transmitted to content providers with content requests from the same user even though the user may be using a different client device. Such a configuration can provide the user with the benefits of personalized content and privacy protection across any number of user devices. In addition, content providers are given the opportunity to receive at least some identifying data and to serve relevant content and advertisements with the consent of the user.

Networked Content Delivery Environment

Turning now to FIG. 1, example communications and data flows over one or more data networks between a client device 104, an intermediary system 102, and a content server 106 will be described. A user may use the client device 104 to initiate a request for content at (1). The content may include, but is not limited to, content pages, images, videos, music, animations, electronic books, documents, applications, and the like. Although the request is a request for content offered by the content server 106, the request may be transmitted to an intermediary system 102 at (2) which retrieves the content on behalf of the user and offers services and features to protect the privacy of the user. The request may be formatted and transmitted according to a protocol that both the client device 104 and the intermediary system 102 understand, such as an HTTP GET request. The HTTP GET request may include a network address for the specific content item that is requested, such as a URL. In addition, identifying information that the client device 104 previously received from the content server 106 may be included in the HTTP GET request, such as a cookie.

The intermediary system 102 may modify or block the cookie at (3), depending on user preferences, characteristics of the cookie, etc. For example, the user may wish to share only generalized demographic information with the content server 106. The cookie that is transmitted with the content request, however, may contain specific information, such as an identifier of the user or the client device, the user's account ID with a content provider associated with the content server 106, the user's birth date, geographic location, and other information. The intermediary system 102 may have knowledge of the structure of the cookie, and can therefore remove such tracking data or specific demographic information and replace it with more generalized information, such as an age range and a gender. The intermediary system 102 can then transmit the content request with the modified cookie to the content server 106 at (4). In some cases, the intermediary system 102 may not have knowledge of the structure of the cookie, and may therefore be unable to modify the cookie to remove tracking data or specific demographic information and replace it with generalized information. In such cases, the intermediary system 102 may strip the cookie from the request or otherwise block it from being transmitted to the content server 106. Optionally, the intermediary system 102 may provide generalized demographic information to the content server 106 through the use of custom data fields added to the request, such as HTTP headers. The intermediary system 102 may also append data to the query string of the URL, utilize RESTful APIs, or use other techniques to share generalized demographic information with the content server 106. The intermediary system 102 may use these techniques in place of the cookie when it is unable to modify the cookie, or it may block cookies and use other techniques as a general rule or according to user preferences.

The intermediary system 102 may receive the requested content from the content server 106 at (5). The content may include identification or tracking information, such as a cookie. The intermediary system 102 may strip the cookie from the response or otherwise block transmission of the cookie to the client device 104 at (6). In some cases, the intermediary system 102 may modify the cookie at (6) rather than stripping it from the response or blocking transmission of it. In either case, the requested content may be transmitted to the client device 104 at (7). The transmission to the client device 104 may include a modified cookie or other identifying information, or may completely exclude the cookie or other tracking information. In some embodiments, cookies and other tracking information may be transmitted to the client device 104 without modification. In such cases, the cookies may be modified by the intermediary system 102 when they are included in a subsequent request to the content server, as described above.

Figure 2:
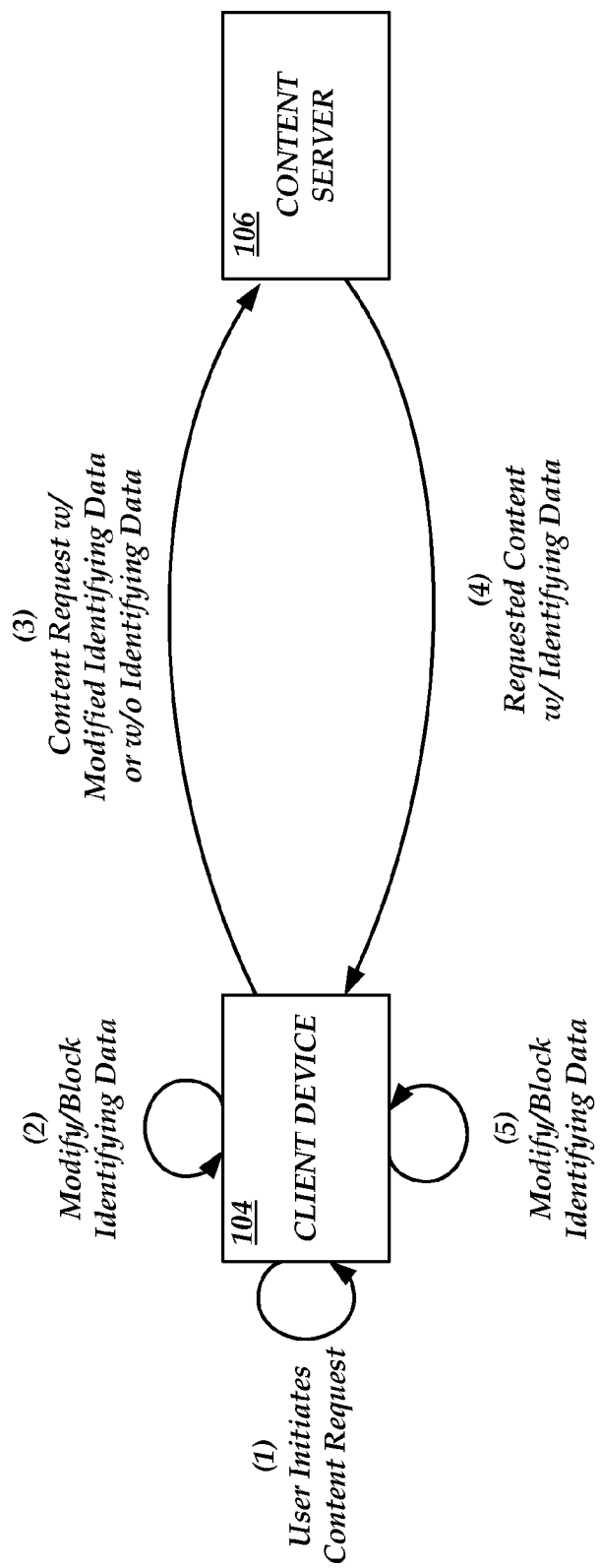
FIG. 2 is a block diagram of illustrative communications and data flows between a client device and a content server.

In some embodiments, no intermediary system 102 is used. Rather, the browser or some other component executing on the client device 104 can perform the functions described above as provided by the intermediary system 102. FIG. 2 illustrates example communications and interactions between a client device 104 and content server 106, such as those that may occur in embodiments in which the browser or some other component of the client device 104 implements the features for modifying identifying information.

As illustrated in FIG. 2, the user may initiate a content request from a client device 104 at (1). However, rather than transmit the content request to an intermediary system 102, the browser may modify or block demographic or identifying information at (2) prior to transmitting the request directly to the content server 106 at (3). The browser may modify or block the identifying information as described above, such as by modifying a cookie, adding customer HTTP headers to the request, and the like.

The client device 104 may receive the requested content from the content server 106 at (4). The response from the content server 106 may include a cookie or some other tracking information to store on the client device 104 and that is to be returned to the content server 106 with subsequent content requests. As described above with respect to an intermediary system 102, the browser or some other component of the client device 104 may modify or block the tracking information from being stored on the client device 104 at (5).

Figure 3:
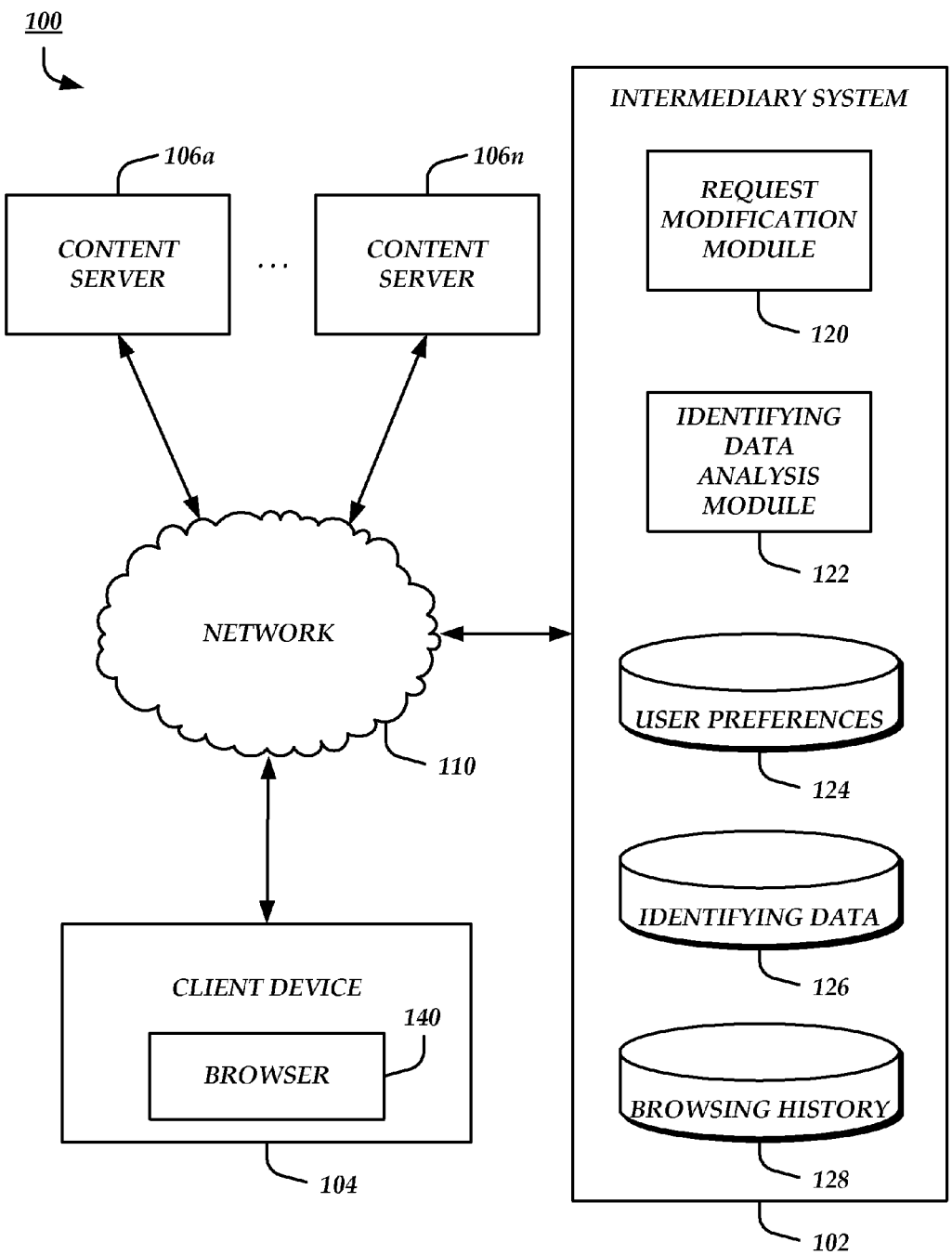
FIG. 3 is a block diagram of an illustrative content delivery environment including a client device, an intermediary system, and multiple content servers.

Turning now to FIG. 3, an example content delivery environment 100 in which identifying information may be modified or blocked prior to transmission to a content server 106 will be described. As described above with respect to FIG. 1, a content delivery environment 100 can include an intermediary system 102, a client device 104, and any number of content servers 106a-106n. The various systems may communicate with each other via a communication network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The intermediary system 102 can be any computing system that serves as an intermediary between a client device 104 and content servers 106. For example, the intermediary system 102 can be an intelligent proxy server, a system operated by an internet service provider (ISP), or some other device or group of devices that retrieve content on behalf of client devices 104. Illustratively, the intermediary system 102 of FIG. 3 is configured to serve as a proxy between the client device 104 and the content servers 106. The intermediary system 102 can include a number of components, such as a request modification module 120, an identifying data analysis module 122, a user preferences data store 124, an identifying data store 126, and a browsing history data store 128. In some embodiments, the intermediary system 102 may include additional or fewer components than illustrated in FIG. 3. For example, the intermediary system 102 may not include a tracking data analysis module 122, or may include or otherwise be associated with various additional computing resources, such as content delivery network (CDN) systems, domain name system (DSN) servers, and the like.

The intermediary system 102 may include multiple computing devices, such as computer servers, logically or physically grouped together. The components of the intermediary system 102 can each be implemented as hardware, such as a server computing device, or as a combination of hardware and software. In addition, the components of the intermediary system 102 can be combined on one server computing device or separated individually or into groups on several server computing devices. In some embodiments, the intermediary system 102 can include multiple instances of a single component, etc.

The client devices 104 can correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. A client device 104 may be configured with a browser application 140 to communicate via the network 110 with other computing systems, such the intermediary system 102 or content servers 106, and to request, receive, process, and display content.

In some embodiments, the content delivery environment 100 may not include a separate intermediary system 102. Rather, request modification and privacy preservation features of the intermediary system 102 may be implemented by the client device 104. In such cases, the browser 140 or some other component of the client device 104 may include a request modification module, various data stored, and the like.

The content servers 106 can correspond to logical associations of one or more computing devices for hosting content and servicing requests for the hosted content over the network 110. For example, a content server 106 can include a web server component corresponding to one or more server computing devices for obtaining and processing requests for content (such as content pages) from the client device 104, the intermediary system 102, or other devices or service providers. In some embodiments, one or more content servers 106 may be associated with a CDN service provider, an application service provider, etc.

In operation, one or more client computing devices 104 may be associated with an intermediary system 102. For example, a client computing device 104 may utilize proxy and caching services provided by the intermediary system 102. A user of the client device 104 may initialize a browser application 140 and transmit a request for a content page, such as a web page. Due to the association with the intermediary system 102, the request may be transmitted to the intermediary system 102 rather than directly to the content server 106 of the content page. The request modification module 120 may detect the presence of identifying or demographic information in the request, and modify the information prior to forwarding the request to a content server 106 in order to retrieve the requested content. The modifications may be based on user preferences previously supplied by the user and stored in the user preferences data store 124.

As described above, the identifying information may be contained in a cookie, and the intermediary system 102 may require knowledge of the structure of the cookie in order to modify it. The intermediary system 102 may be provided with information regarding the structure of the cookie from a system administrator or from some entity associated with the content server 106 that originally transmitted the cookie to the client device 104. In some embodiments, the intermediary system 102 may analyze cookies sent to or received from a number of different client devices 104 in order to determine how to modify the cookie. For example, the identifying data analysis module 122 may analyze cookies that are received from content servers 106 for transmission to client devices 104. The identifying data analysis module 122 may compare cookies received from a single content server 106 for transmission to different client devices 104 in order to detect differences in the identifying data contained therein. Such identifying data may be stored in an identifying data store 126 for future reference. If the identifying data analysis module 122 or some other component of the intermediary system 102 has access to demographic or identifying data regarding specific users, then the identifying data analysis module 122 may be able to determine how such information is presented in the cookie based on how differences in the cookies correspond to differences in the identifying data associated with the users. In some embodiments, the intermediary system 102 may have access to demographic and identifying data for individual users as part of the user preferences data store 124. In additional embodiments, the intermediary system 102 may record or infer such identifying data over the course of one or more user browsing sessions based on the requests and other information submitted by the user.

Sample Process for Modifying Identifying Data

Figure 4:
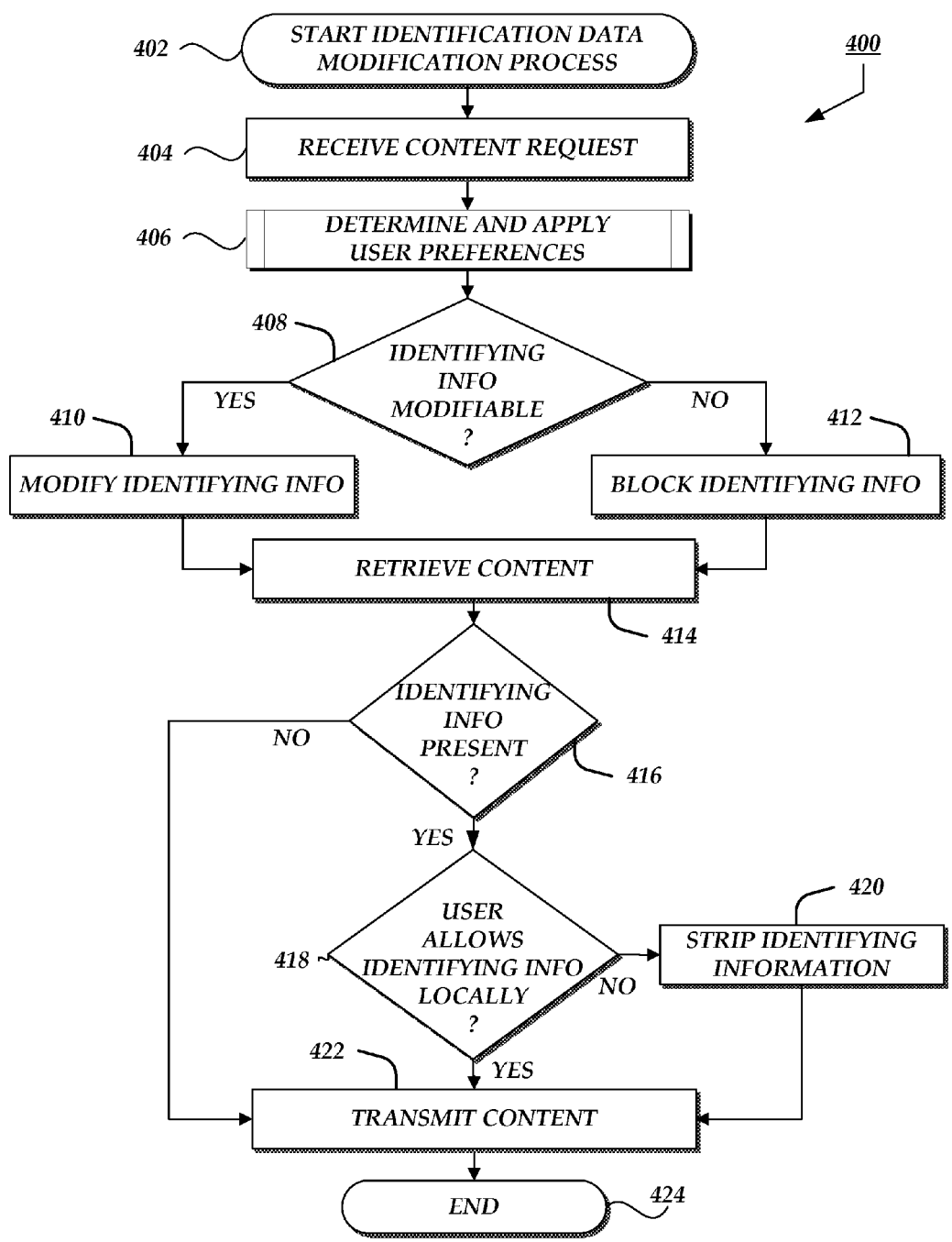
FIG. 4 is a flow diagram of an illustrative process for modifying identifying data that may be transmitted to a content server, and for modifying identifying data that may be returned from the content server.

FIG. 4 illustrates a sample process 400 for modifying identifying data prior to transmission to a content server 106. The process 400 illustrated in FIG. 4 will be described with respect to an intermediary system 102 which receives content requests from the client devices 104 and retrieves the requested content from content servers 106 on behalf of the requesting client devices 104. Advantageously, tracking, demographic, or other identifying information embedded into or associated with the content request may be modified according to user preferences such that the user's privacy may be maintained. In addition, the content server 106 is provided with information that may be used to provide a more relevant response to the content request than may otherwise be possible in the absence of all identifying information. It will be appreciated that the process 400 or portions thereof may be implemented by a browser 140 or some other component of a client device 104, either in conjunction with an intermediary system 102 or in the absence of an intermediary system.

Figure 6:
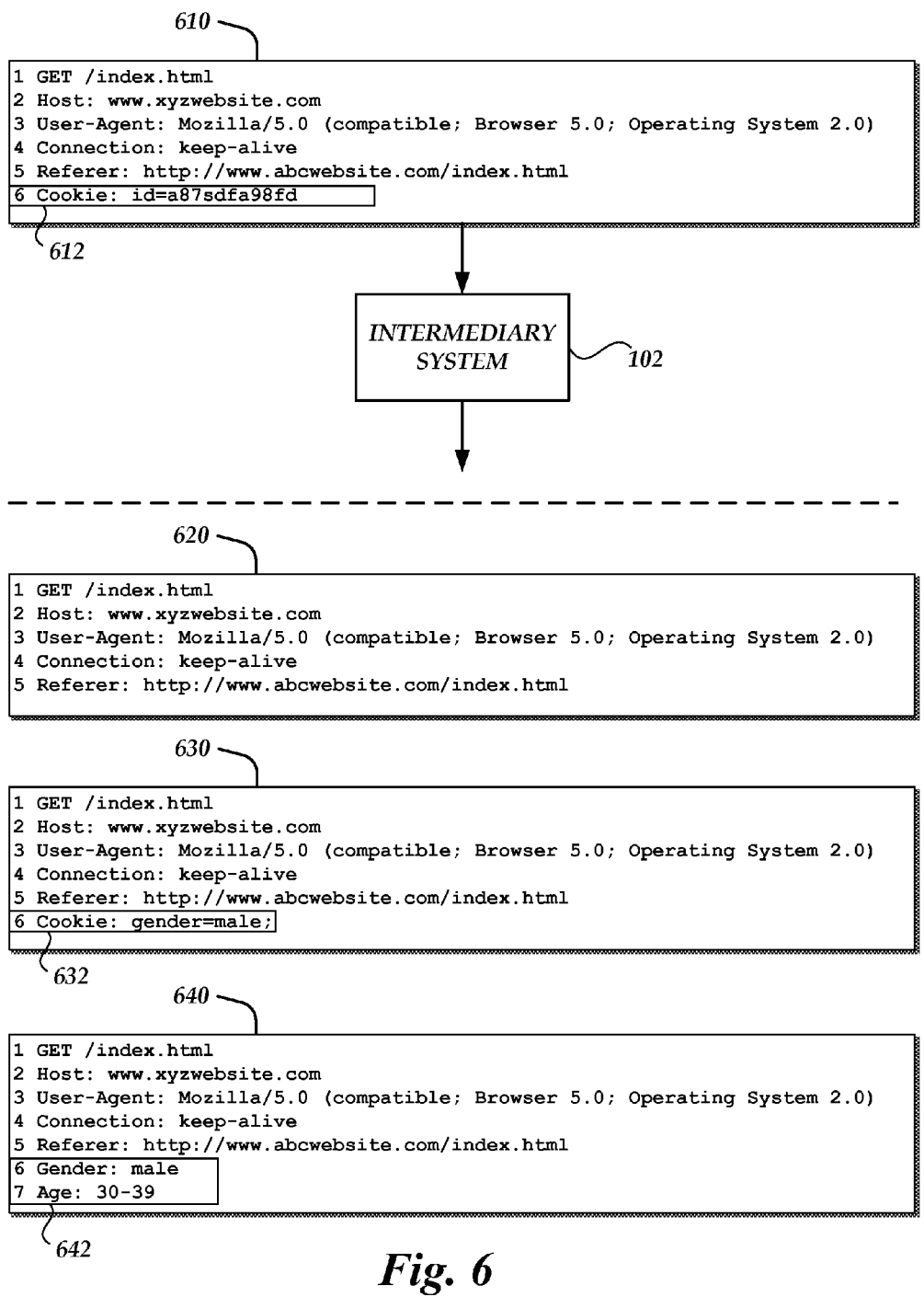
FIG. 6 is a block diagram of several illustrative modifications that may be made to cookies and other data that may identify a user to a content server.
Figure 7:
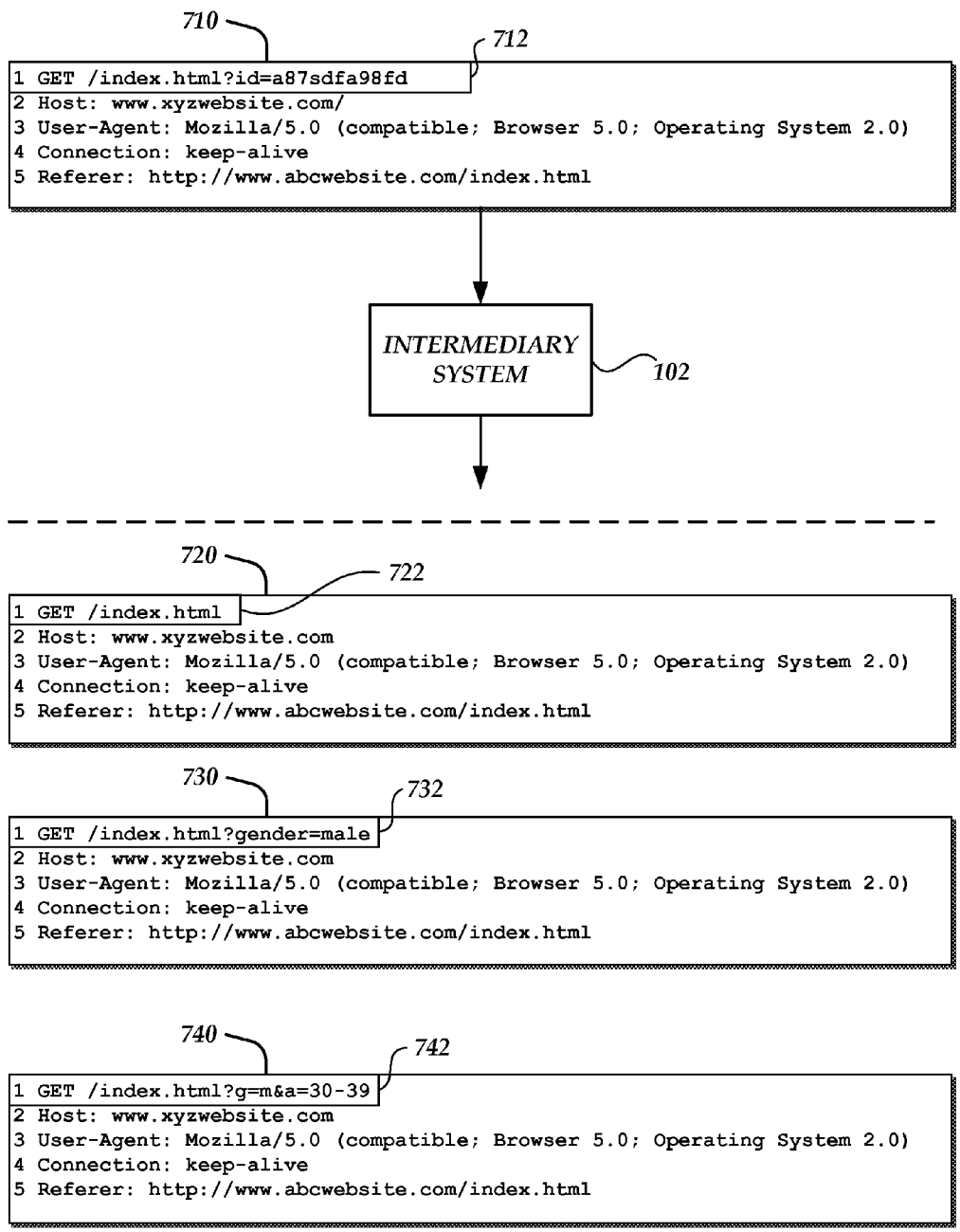
FIG. 7 is a block diagram of several illustrative modifications that may be made to a query sting that may identify a user to a content server.

The process 400 begins at block 402. At block 404, the intermediary system 102 receives a content request from a client device 104. As described above, the content request may include identifying information in the form of a cookie, query string, etc. The identifying information can include demographic information about the user (e.g., gender, age, geographic location), or it may be purely identifying data (e.g., account number, username, device identifier). FIG. 6 illustrates an example HTTP GET request that contains identifying information in the form of a cookie. As seen in original request 610, the cookie 612 identifies the user or device by the identifier "a87sdfa98fd." The example in FIG. 6 is illustrative only. It will be appreciated that other identifiers and techniques known to those of skill in the art may be used by content providers to identify or track a user or device. FIG. 7 illustrates an example HTTP GET request that contains the identifying information in the form of a query string. As seen in original request 710, the GET request 712 includes a query string appended to the end of the identifier of the requested resource (index.html in this case). The query string also identifies the user or device by the identifier "a87sdfa98fd."

Figure 5:
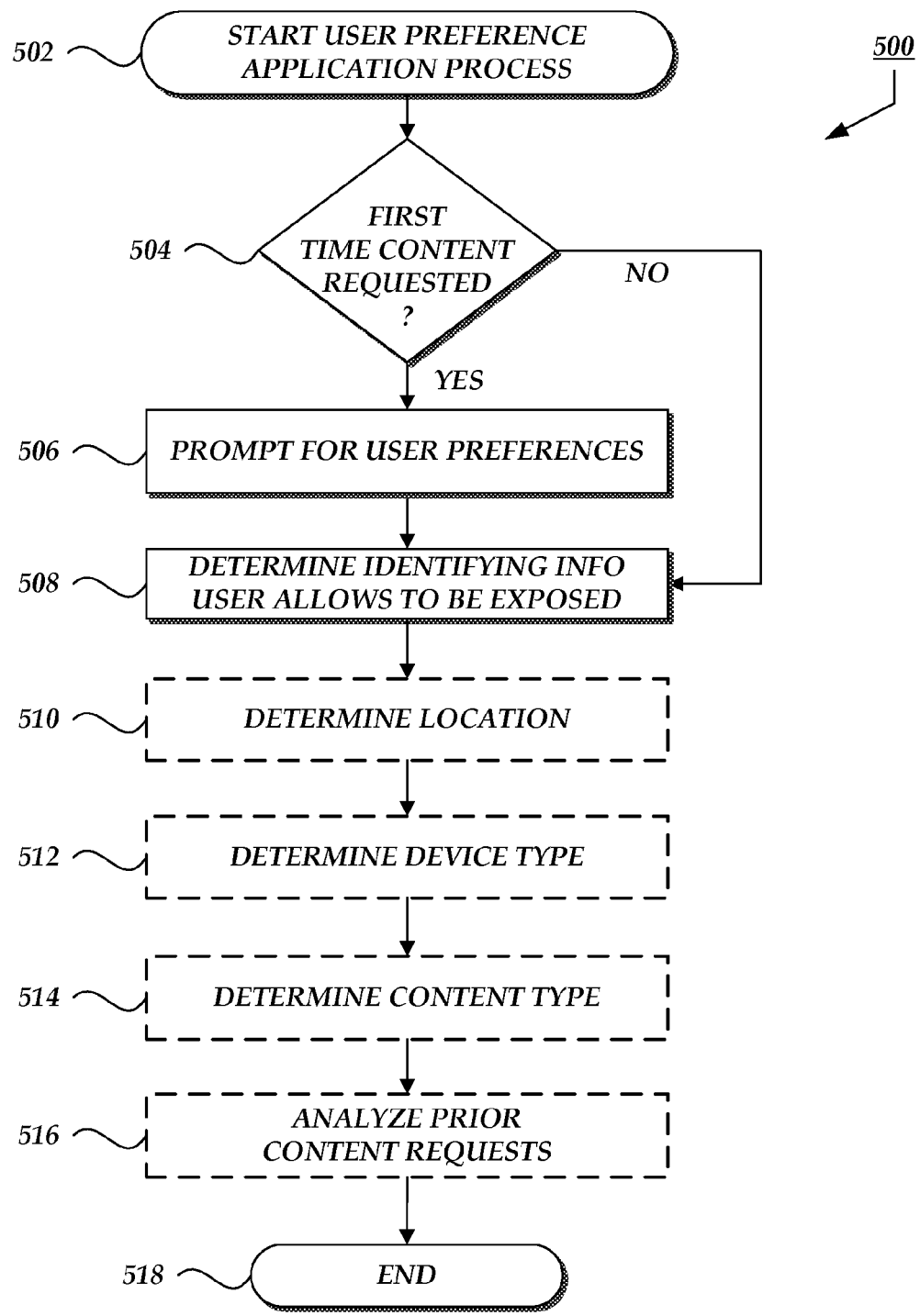
FIG. 5 is a flow diagram of an illustrative process for determining user preferences regarding demographic and other identifying data that may be transmitted to a content server.

Returning to FIG. 4, at block 406 the intermediary system 102 may load or otherwise determine the user preferences for the current request. The user preferences may indicate what information the user wishes to share, what information the user wishes to prevent from being shared, how the user wishes to have demographic or other identifying information generalized, and the like. In some embodiments, the user preferences may be customized for specific content types, content servers or groups of content servers. FIG. 5, described below, illustrates a sample process for determining user preferences regarding modification of identifying information.

With continuing reference to FIG. 4, at decision block 408 the intermediary system 102 can determine whether the identifying information associated with the current content request is modifiable. For example, some content servers 106 may store encrypted cookies on client devices 104 for return to the content server 106 with subsequent requests. If the intermediary system 102 is not able to decrypt the cookie, then the cookie may be assumed to contain identifying information and be determined not to be modifiable. In another example, some cookies, query strings, and the like may not be encrypted, but nevertheless the intermediary system 102 may not have adequate information about the structure of the cookie or query string in order to modify it. If intermediary system 102 determines that it is able to modify the identifying information, the process 400 may proceed to block 410. Otherwise, the process may proceed to block 412.

At block 410, the intermediary system 102 can modify the identifying information. In some embodiments, the intermediary system 102 may follow a standard protocol for modifying information, such as generalizing demographic information to reduce the chance that a particular user or client device 104 may be detected by the content server 106. Modification of demographic information coupled with transmitting the request from the intermediary system 102 rather than directly from the client device 104 may shield the user's or client device's 104 identity from the content server 106. As described above, identifying information may alternatively be modified according to user preferences. A user may specify which pieces of information may be shared, which pieces of information may not be shared, how information is to be generalized, and the like. The request modification module 120 or some other component of the intermediary system 102 may access the cookie, query string, RESTful API call, or other communication associated with the content request and remove information that is not to be shared or replace information that is to be generalized.

FIG. 6 illustrates several modified requests that may be created by the request modification module 120. Modified request 630 includes a modified cookie 632 that includes only gender information. As seen in comparison with the original request 610, the cookie previously contained an identifier of the user or device. A content provider may have used such an identifier in order to match the request to a profile regarding the user, such as detailed demographic information, data regarding previous content requests, and other information that a user may wish to keep private. Modified request 640 includes customized HTTP headers 642 corresponding to gender and age. As seen in comparison with the original request 610, the generalized age range (e.g., 30-39) has been included. The intermediary system 102 may notify the particular content server 106, or content servers 106 in general, that such custom HTTP headers will be used to transmit demographic or identifying information, and that other attempts to receive such information will be blocked. Content servers 106 may choose to look for identifying information in the custom HTTP headers. If content servers 106 choose not to, or do not know of the custom HTTP headers, they will not affect the transmission of the request to the content server 106.

FIG. 7 illustrates modifications that may be made to query strings by the request modification module 120 for requests that use the query string instead of a cookie to transmit identifying information. Modified request 730 includes a modified GET request 732 with a query string that includes only gender information, rather than the identifier of the user or device that was included in the original request 710. Modified request 740 includes a modified GET request 742 with a query string that includes customized data fields for transmitting identifying information. A gender field (the "g" field) and an age field (the "a" field) have been added. The fields include data regarding the gender and generalized age range of the user. The result is similar to the customized HTTP headers described above and illustrated in FIG. 5.

Returning to FIG. 4, at block 412 the intermediary system 102 does not modify the identifying information. Rather, it may strip or otherwise block the cookie or other communication likely to contain identifying information from being transmitted to the content server. FIG. 6 illustrates a modified request 620. As seen in comparison with the original request 610, the cookie 612 has been removed from the request. FIG. 7 illustrates another example of a modified request 720. As seen in comparison with the original request 710, the query string 712 has been removed.

At block 414, the intermediary system 102 can retrieve the content from the content server 106 on behalf of the client device 104. A modified request may be transmitted to the content server 106, and the requested content may be received in response. In some cases, identifying information, such as a cookie with demographic or other identifying information, may be received with the requested content. At decision block 416, the intermediary system can determine whether such identifying information is present. If no identifying information is detected, the process 400 may proceed to block 422, where the intermediary system 102 can transmit the requested content to the client device 104. If identifying information is detected, however, the process 400 may proceed to decision block 418.

At decision block 418, the intermediary system can determine whether the identifying information should be transmitted to the client device 104. In some cases, identifying information may be allowed to be transmitted to the client device. For example, because subsequent requests are routed through the intermediary system 102 which can strip out such information prior to transmitting it back to the content server 106, the identifying information may be permitted to be transmitted to the client device 104. In such cases, the process 400 proceeds to block 422. In other cases, no identifying information may be permitted to be sent to the client device 104. In such cases, the process 400 proceeds instead to block 420, where the identifying information is stripped from the request or otherwise blocked from being transmitted to the client. The identifying information may be discarded, or it may be stored in a identifying information data store 126. Advantageously, identifying information stored in the identifying data store 126 may be accessed from other client devices 104. A user may be permitted to take advantage of the personalized content that is transmitted by content servers 106 that receive identifying information with content requests even though the user makes a subsequent request from a different client device. In such cases, the intermediary system 102 can access the identifying data store 126 when it receives a request and determine whether there is identifying data present that may be transmitted to the content server, either in modified or unmodified form.

In some embodiments, the user may specify, based on individual client servers, groups of client servers, content type, etc., whether identifying data is to be stripped prior to transmission of content to the client device 104. For example, the user may assign particular privacy levels or settings to particular classes or categories of sites (e.g., shopping, news, social networking, etc.). The classes may be based on trust levels or reputations of the content providers, as determined by the provider of the intermediary system or by a third party. In some cases, default privacy settings may be used such that the user need not explicitly assign privacy settings for reach class or category.

Turning now to FIG. 5, an illustrative process 500 for determining user preferences regarding identifying information will be described. In some embodiments, the process 500 may be executed in-line or concurrently with portions of the process 400 described above. For example, the process 500 may be executed at block 406 of process 400. The process 500 will be described as implemented by an intermediary system 102. As will be appreciated, the process 500 or portions thereof may also or alternatively be implemented by a browser 140 or some other component of a client device 104.

The process 500 begins at block 502. At decision block 504, the intermediary system 102 can determine whether a request is being made to a content server 106 from a particular user or client device 104 for the first time. If so, the process 500 may proceed to block 506 where the user may be prompted to indicate preferences regarding the transmission of demographic and other identifying information. For example, a graphical user interface may be displayed to the user, and the user may be prompted to indicate whether identifying information may be passed to the content server 106, whether and which information may not be passed, whether and how information may be generalized, etc. In addition, the user may provide groupings of content servers 106 such that user preferences may be applied to the entire group rather than on an individual content server 106 basis.

At block 508, the intermediary system 102 may determine the particular information that may be exposed in accordance with the user specifications. As described above, this may include generalizing specific demographic info, blocking certain demographic info, and the like. Depending on the information that a user wishes to share, some, all, or none of the remaining blocks 510-516 of the process 500 may be executed. In some embodiments, a user may not wish to share any demographic information, but may permit limited identifying information to be shared. For example, some content servers 106 serve a different version of content if the user is requesting content from the content server 106 for the first time than may be served to repeat visitors. In such cases, the user may allow some indicator to be shared that the user is a repeat visitor, but may wish to have all other identifying information stripped or blocked from transmission.

In some cases, the location or some generalized data based on the location may be provided to content servers 106. At block 510, the intermediary system 102 may determine the location of the client device 104 from which the request was received. For example, the IP address of the client device 104 may be used to determine the geolocation of the client device 104. In some cases, the device type or some generalized data based on the device type may be provided to content servers 106. At block 512, the intermediary system 102 may determine the type of client device 104 that the user is using to request content. For example, data regarding the operating system and browser of the client device 104 may be included in the User-agent HTTP header, and the intermediary system 102 can attempt to determine the device type from that and other data. Data regarding the location and/or device type may need to be determined and specifically added to the request by the intermediary system 102 if, for example, the request that is transmitted from the intermediary system 102 to the content server 106 would indicate properties of the intermediary system 102 rather than the client device 104. In such cases, and when the user allows device type or location information to be transmitted to client servers 106, it can be determined and added by the intermediary system 102.

At block 514, the intermediary system 102 can determine the content type. For example, the user may have assigned user preferences to an entire type of content, and the intermediary system 102 may determine the type of content that is requested in order to determine the proper user preferences to use when processing the request. In some embodiments, the user may have assigned user preferences to an entire group of content servers 106 instead of or in addition to a type of content.

At block 516, the intermediary system 102 may analyze prior content requests, or data provided by a user during prior browsing sessions, in order to automatically determine demographic and identifying information for the user. For example, the user may indicate that information regarding age range and gender are allowed to be shared with content servers 106. However, the user may not actually indicate the specific gender or age range to share. In such cases, the intermediary system 102 can analyze prior content requests and browsing session activity. Data regarding the user's historical browsing activity may be available in the browsing history data store 128. If the user routinely searches for or accesses content regarding a particular group of topics that are associated with male interests, the intermediary system 102 may determine that the user is a male. The intermediary system 102 may do so even the absence of specific information from the user. As another example, if the user routinely searches for or accesses content regarding particular group of topics that are associated with people between the ages of 30-39, the intermediary system 102 may determine that the user is between the ages of 30-39. In some embodiments, the analysis of prior browsing history is not performed while processing a particular request due to the computational requirements of the analysis, such as the time required. In such casers, the analysis may occur when the user's browsing session is idle, or when the user is offline.

In some embodiments, demographic and other identifying information may be transmitted to a content server even in the absence of identifying information previously provided by the content server. For example, the first time a user requests a content page from a particular content server, identifying info may be generated and transmitted to the content server even though no cookie was previously received from the content server. In such cases, a new cookie may be created, either by the browser 140 or by the intermediary server 102, prior to transmission of the request to the content server 106. In response, the content server 102 can generate a personalized or otherwise more relevant response than would normally be possible in response to a first-time content request.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by one or more processors or computing devices, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

For example, each of the processes described with respect to FIGS. 4 and 5 may be embodied in a set of executable program instructions stored on a computer-readable medium, such as one or more disk drives, of the computing system with which the intermediary system is associated. When the processes are initiated, the executable program instructions can be loaded into memory, such as RAM, and executed by one or more processors of the computing system. In some embodiments, the computing system may include multiple computing devices, such as servers, and the processes may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for anonymizing content requests, the system comprising:
   one or more processors;
   a computer-readable memory; and
   executable instructions stored in the computer-readable memory, wherein the one or more processors are programmed by the executable instructions to at least:
      receive, from a client device, a request for a content item hosted by a content server, the request comprising tracking information associated with a user of the client device, the tracking information previously provided to the client device by the content server;

modify the request to generate a modified request comprising, in place of the tracking information, user information that is substantially anonymous, wherein the user information may be used to customize content for the user; and transmit the modified request to the content server, the modified request excluding the tracking information.

2. The system of claim 1, wherein the content item comprises a network-accessible content page.

3. The system of claim 1, wherein the request comprises a cookie, and wherein the cookie comprises the tracking information.

4. The system of claim 1, wherein the request comprises a query string, and wherein the query string comprises the tracking information.

5. The system of claim 1, wherein the user information is based at least in part on a preference of the user.

6. A computer-implemented method for managing content requests, the computer-implemented method comprising:

receiving from a client device, in association with a request for a content item hosted by a content server, identifying information associated with the client device or a user of the client device, wherein the identifying information is provided by the content server; and in response to receiving the request:

modifying the request to generate a modified request incorporating, in place of at least a portion of the identifying information, non-user-identifying information associated with the user;

retrieving, by an intermediary system comprising one or more computing devices, the content item from the content server using the modified request; and transmitting the content item to the client device.

7. The computer-implemented method of claim 6, wherein the content item comprises a content page, image, video, or document.

8. The computer-implemented method of claim 6 further comprising receiving a cookie from the client device, wherein the cookie comprises the identifying information.

9. The computer-implemented method of claim 6, wherein the request comprises a query string, and wherein the query string comprises the identifying information.

10. The computer-implemented method of claim 6, wherein the identifying information is transmitted to the client device during a prior browsing session.

11. The computer-implemented method of claim 6, wherein the identifying information comprises an identifier of the user or an identifier of the client device.

12. The computer-implemented method of claim 6, wherein the non-user-identifying information comprises data regarding a demographic characteristic of the user.

13. The computer-implemented method of claim 6, wherein the non-user-identifying information is based at least in part on a preference of the user.

14. The computer-implemented method of claim 6, further comprising generating the non-user-identifying information by removing a portion of identifying information.

15. The computer-implemented method of claim 6, wherein the non-user-identifying information is transmitted in a custom data field.

16. The computer-implemented method of claim 6, wherein the non-user-identifying information is transmitted in a custom Hypertext Transfer Protocol header.

17. The computer-implemented method of claim 16, further comprising notifying the content server of the custom Hypertext Transfer Protocol header.

18. The computer-implemented method of claim 6, further comprising analyzing a plurality of identifying information generated by the content server to determine a structure of the identifying information.

19. The computer-implemented method of claim 6, further comprising analyzing a plurality of prior content requests received from the client device to determine the non-user-identifying information.

20. A non-transitory computer storage medium comprising a browser module configured to execute a process on a client device, the process comprising:

receiving, from a content server in response to a request for a first content item hosted by the content server, a cookie comprising identifying information associated with the client device or a user of the client device;

modifying the cookie to generated a modified version of the cookie based on data regarding a cookie structure used by the content server, the modified cookie comprising, in place of at least a portion of the identifying information, user information that is substantially anonymous;

transmitting, to the content server, a second request for a second content item, the second request comprising the modified version of the cookie; and receiving, from the content server, the requested content item.

21. The non-transitory computer storage medium of claim 20, wherein the identifying information comprises tracking information regarding the user or the client device.

22. The non-transitory computer storage medium of claim 21, wherein the modified version of the cookie comprises user demographic information.

23. The non-transitory computer storage medium of claim 20, wherein the modifying comprises replacing at least a portion of the identifying information.

24. The non-transitory computer storage medium of claim 20, wherein the modifying comprises removing the identifying information and adding the user demographic information.

25. A system for managing content requests, the system comprising one or more processors programmed to at least:

receive, from a user of a browser application executing on a client device, a request for content offered by a content server, the request comprising identifying information associated with the user or the client device;

determine a category for the content server, wherein the category is associated with one or more content servers and one or more user privacy preferences;

modify the request to incorporate, in place of at least a portion of the identifying information, demographic information associated with the user according to at least a first user privacy preference associated with the category, wherein the demographic information is substantially anonymous; and transmit the modified request to the content server.

26. The system of claim 25, wherein the demographic information is transmitted in a cookie.

27. The system of claim 25, wherein the demographic information is transmitted in a Hypertext Transfer Protocol header.

28. The system of claim 25, wherein modifying the request is performed by a client device.

29. The system of claim 25, wherein modifying the request is performed by an intermediary system.

30. A computer-implemented method for managing content requests, the computer-implemented method comprising:
- receiving from a content server, in association with a first content item, a cookie;
- in response to receiving the cookie:
  - storing the cookie at an intermediary system comprising one or more computing devices; and
  - transmitting the first content item without the cookie to a destination client device associated with a user;
- receiving, from a requesting client device associated with the user, a request for a second content item offered by the content server, wherein the request for the second content item does not include the cookie; and
- retrieving, on behalf of the user, the second content item from the content server, wherein retrieving comprises transmitting the cookie to the content server.

31. The computer-implemented method of claim 30, wherein the requesting client device is the destination client device.

32. The computer-implemented method of claim 30, wherein the requesting client device is separate from the destination client device.

33. The computer-implemented method of claim 30, further comprising replacing at least a portion of identifying information in the cookie with user demographic information associated with the user.

* * * * *